United States Patent [19]
Umeda et al.

[11] Patent Number: 5,833,858
[45] Date of Patent: Nov. 10, 1998

[54] METHOD OF CONCENTRATION OF ACIDIC PHOSPHOLIPID

[75] Inventors: Tomoshige Umeda; Yoshihisa Katsuragi; Kazuya Otsuji, all of Ibaragi, Japan

[73] Assignee: Kao Corporation, Tokyo, Japan

[21] Appl. No.: 656,050

[22] Filed: May 31, 1996

[30] Foreign Application Priority Data

Jun. 19, 1995 [JP] Japan .................................... 7-151260

[51] Int. Cl.$^6$ .............................. B01D 11/00; A23L 1/20
[52] U.S. Cl. ......................... 210/634; 210/774; 426/430; 554/83
[58] Field of Search ..................................... 210/651, 652, 210/634, 774; 554/83, 79, 80, 82; 514/78; 426/430, 609, 662, 811, 9, 10, 12, 15

[56] References Cited

U.S. PATENT DOCUMENTS

| | | | |
|---|---|---|---|
| 4,496,489 | 1/1985 | Gupta | 260/428.5 |
| 5,214,171 | 5/1993 | Dijkstra et al. | 554/83 |
| 5,319,116 | 6/1994 | Viole et al. | 554/83 |
| 5,362,892 | 11/1994 | Umeda et al. | 554/83 |

FOREIGN PATENT DOCUMENTS

| | | | |
|---|---|---|---|
| 253758 | 2/1988 | Germany | 426/430 |
| 63-105645 | 5/1988 | Japan . | |
| 1-277457 | 11/1989 | Japan . | |

*Primary Examiner*—Joseph W. Drodge
*Attorney, Agent, or Firm*—Oblon, Spivak, McClelland, Maier & Neustadt, P.C.

[57] ABSTRACT

A method of the concentration of acidic phospholipids is disclosed, which comprises a first step wherein lecithin originating in a plant is treated with a solvent containing from 85 to 100% by weight of a lower alcohol and then eliminating the solvent fraction containing said lower alcohol to thereby give a phospholipid mixture, and a second step wherein said phospholipid mixture is treated by using an aqueous solution containing 75% by weight or less of ethanol.

In the method of the present invention, the water-soluble components contained in the phospholipid mixture obtained in the first step are efficiently removed in the second step. Thus a lipid mixture containing acidic phospholipids at a high concentration can be relatively easily obtained from the lecithin originating in a plant. This lipid mixture is useful as an emulsifier or a taste modifier.

6 Claims, No Drawings

METHOD OF CONCENTRATION OF ACIDIC PHOSPHOLIPID

FIELD OF THE INVENTION

This invention relates to a method for highly concentrating acidic phospholipids, which are useful as an emulsifier or a taste modifier for foods, oral drugs and cosmetics, from lecithin originating in a plant.

BACKGROUND OF THE INVENTION

Lecithin originating in a plant includes those obtained from oilseeds such as soybean, rapeseed, corn and peanut. Among these, soybean lecithin is the most common one. Soybean lecithin usually comprises phospholipids such as phosphatidylcholine (PC), phosphatidylethanolamine (PE), phosphatidylinositol (PI) and phosphatidic acid (PA) together with glycolipids, neutral lipids and water-soluble components.

There have been disclosed various methods for purifying phospholipids from these mixture without altering the properties by, for example, enzyme reactions. Examples of these methods include a method using ethanol (JP-A-54-61200, JP-A-60-55095, JP-A-1-277457, JP-A-3-15342, JP-3-58994; the term "JP-A" as used herein means an "unexamined published Japanese patent application"), a method using semipermeable membranes or ultrafiltration membranes (JP-A-62-39594, JP-A-62-45592), a method using divalent or trivalent metal salts (JP-A-58-179437), a method using adsorbents such as silica (JP-A-59-152392, JP-A-60-197696, JP-A-61-145189, JP-A-61-176597, JP-A-62-59287, JP-A-3-227399, JP-A-5-132490), a method using carbon dioxide in the supercritical state (JP-A-61-74548) and a method wherein these methods are combined (JP-A-61-191689, JP-A-62-22556, JP-A-3-141288, JP-A-4-135457, JP-A-5-176687).

Although these methods of the purification of phospholipids are performed in order to concentrate PC or PE as described in JP-A-63-105645 and JP-A-1-277457, most of them merely achieve the elimination of neutral lipids and cholesterol, the improvement in the taste and color or the removal of cloudiness. Namely, none of them aims at concentrating acidic phospholipids. Although phospholipids are fractionated into individual components by the methods using adsorbents such as silica, these methods are not suitable for industrial processes to be effected at a low cost.

It is also possible to convert PC and PE into acidic phospholipids such as PA or phosphatidylglycerol (PG) by using enzymes (phospholipase D, etc.). However, this method suffers from some problems such that a complicated procedure is required in the separation of the product from the enzyme and that the enzyme is expensive.

Accordingly, it has been required to develop a method whereby acidic phospholipids can be conveniently concentrated.

SUMMARY OF THE INVENTION

Accordingly, an object of the present invention is to provide a method for highly concentrating acidic phospholipids from lecithin originating in a plant by solvent fractionation.

Under these circumstances, the present inventors have conducted extensive studies. As a result, they have successfully found out that a phospholipid mixture containing acidic phospholipids at a high concentration can be obtained by treating lecithin originating in a plant with a solvent containing a specific lower alcohol, and then the acidic phospholipids can be further concentrated by treating the above-mentioned phospholipid mixture with an aqueous solution containing a specific amount of ethanol, thus completing the present invention.

Therefore, the present invention provides a method of the concentration of acidic phospholipids which comprises a first step wherein lecithin originating in a plant is treated with a solvent containing from 85 to 100% by weight of a lower alcohol and then eliminating the solvent fraction containing the lower alcohol to thereby give a phospholipid mixture, and a second step wherein the obtained phospholipid mixture is treated by using an aqueous solution containing 75% by weight or less of ethanol.

DETAILED DESCRIPTION OF THE INVENTION

The starting material to be used in the present invention is not particularly restricted, so long as it is lecithin originating in a plant. Examples thereof include phospholipid mixtures obtained from oilseeds such as soybean, rapeseed, corn, sunflower and palm. Among these, soybean lecithin is preferred.

The lecithin originating in a plant may be in the form of either a paste or a powder. Also, the purity of the lecithin originating in a plant is not particularly restricted. It is possible to use lecithin from which impurities have been preliminarily eliminated by a well-known purification method or one in which the acidic phospholipid concentration has been elevated in a well-known manner. It is preferable to use lecithin having a purity of 40% or above.

In addition to the acidic phospholipids, the lecithin originating in a plant may contain neutral phospholipids such as phosphatidylcholine (PC), phosphatidylethanolamine (PD) and lyso-derivatives thereof; neutral lipids such as triglycerides, diglycerides and monoglycerides; fatty acids, sterol lipids and glycolipids at arbitrary ratios. It is preferable, for example, that the lecithin is composed of from 10 to 60% by weight of neutral phospholipids, from 0 to 60% by weight of neutral lipids, from 5 to 80% by weight of acidic phospholipids and from 5 to 50% by weight of other components.

The lower alcohol to be used in the first step of the method of the concentration of acidic phospholipids according to the present invention involves aqueous lower alcohols (i.e., an aqueous solution of lower alcohols) and lower alcohols of 100% in purity. That is to say, it is needed to treat the lecithin originating in a plant with a solvent containing from 85 to 100% by weight of a lower alcohol. The content of the lower alcohol preferably ranges from 90 to 100% (by weight, the same will apply hereinafter unless otherwise noted), still preferably from 95 to 100%.

Preferable examples of the lower alcohol include methanol, ethanol, isopropanol, etc. and ethanol is particularly preferable, though the present invention is not restricted thereto.

The solvent containing a lower alcohol is not particularly restricted. Preferable examples thereof are shown in the following table 1.

TABLE 1

| Preferable lower alcohol solvent | Abbreviation used herein |
| --- | --- |
| (1) Ethanol containing 85 to 100% of ethanol | Ethanol solvent |
| (2) Solvent mixture of lower alcohol containing 85 to 100% of lower alcohol with acetone | Acetone-containing solvent |
| (3) Solvent mixture of lower alcohol containing 85 to 100% of lower alcohol with hexane | Liquid-liquid partition solvent |

In the lower alcohol solvents shown in Table 1, the moisture content of the lower alcohol is preferably 15% or less, still preferably 10% or less, in order to improve the effect of concentrating the acidic phospholipids in the phospholipid mixture. It is also possible to use ethanol or a lower alcohol substantially free from moisture.

In the first step of the present invention, the lecithin originating in a plant may be treated with the solvent containing a lower alcohol by an arbitrary method without restriction. When the ethanol solvent is employed, the treating temperature is preferably 30° C. or more, still preferably from 35° to 80° C. When the extraction is performed at a temperature of lower than 30° C., PE is liable to remain in the extraction residue and thus the concentration of the acidic phospholipids in the residual phospholipids cannot be sufficiently elevated. On the other hand, it is not preferable that the treating temperature exceeds 80° C., since the acidic phospholipid concentrate thus obtained suffers from deterioration in the taste and color in this case.

Although the amount of the ethanol solvent is not restricted, it is recommended to use the above-mentioned lower alcohol in an amount of at least 5 times by weight, preferably at least 10 times by weight and still preferably at least 15 times by weight, as much as the phospholipids contained in the starting lecithin originating in a plant. When the amount of the lower alcohol is less than 5 times by weight as much, it is impossible to obtain a residue containing the acidic phospholipids at a sufficiently high concentration. The term "phospholipids" as used herein means matters insoluble in acetone. Although the procedure may be carried out once, it is preferable to repeat the procedure, in particular, 3 to 5 times. It is preferable that, in each procedure, the above-mentioned ethanol solvent is used in an amount of at least 1 time by weight as much as the phospholipids contained in the starting lecithin originating in a plant.

When the lecithin originating in a plant is treated with the ethanol solvent in accordance with the present invention, PC, among the phospholipids contained in the lecithin originating in a plant, is mainly extracted into ethanol while acidic phospholipids PA and PI remain in the residue. Thus a phospholipid mixture is obtained by eliminating the ethanol solvent fraction. PE is liable to remain in the residue at low temperatures but shows a rapid decrease in the residue at temperatures exceeding 30° C. This tendency is further enhanced by using the ethanol solvent in an amount 5 to 15 times by weight as much as the phospholipids contained in the lecithin originating in a plant under the same temperature conditions.

In the first step of the present invention, the solvent containing a lower alcohol may be a solvent mixture of a lower alcohol with acetone. When an acetone-containing solvent is employed, the weight ratio of the lower alcohol containing 85 to 100% of the lower alcohol to the acetone preferably ranges from 1/99 to 99/1, still preferably form 10/90 to 95/5 in order to improve the concentrating effect, though the present invention is not restricted thereto.

Regarding the ratio of the lecithin originating in a plant to the acetone-containing solvent, this solvent mixture is used in an amount of from 0.1 to 100 parts by weight, preferably from 1 to 50 parts by weight and still preferably from 5 to 35 parts by weight, per part by weight of the lecithin, though the present invention is not restricted thereto. When the solvent mixture is used in an excessively small amount, only a poor concentration efficiency can be achieved. On the contrary, it is not preferable to use the solvent mixture in an excessively large amount, since the yield is lowered in this case.

The temperature in the treatment of the lecithin with the acetone-containing solvent is not particularly restricted. It is preferable that a mixture of the lecithin with the solvent mixture is stirred and filtered at room temperature or more (preferably from 25° to 60° C.) and the fraction of the solvent mixture is eliminated to thereby give the extraction residue. It is preferable to repeat this extraction procedure twice or thrice. It is preferable that the solvent mixture is removed from the extraction residue to thereby give a phospholipid concentrate.

It is still preferable that the acetone-containing solvent further contains 2 to 10%, based on the whole solvent, of hexane, since the concentration of the acidic phospholipids in the phospholipid mixture can be further elevated thereby.

When the liquid-liquid partition solvent is used in the first step of the present invention, the lecithin originating in a plant may be treated with a two-phase solvent preliminarily prepared by mixing the lower alcohol with hexane. However, a preferable process comprises dissolving the lecithin originating in a plant in hexane, then adding and mixing the lower alcohol therewith, separating the lower alcohol phase from the hexane phase, eliminating the lower alcohol phase and thus obtaining a phospholipid mixture from the hexane phase. The lower alcohol and hexane are used in such an amount that the mixture separates out into two phases when allowed to stand after mixing. To determine the amount of the solvent, consideration should be given also to the cost for the recovery of the solvent and working properties in an industrial process. The hexane is used in an amount of from 2 to less than 40 parts by weight, preferably from 5 to less than 30 parts by weight, per part by weight of the lecithin originating in a plant. Regarding the ratio of the lower alcohol to hexane, it is preferable to use the lower alcohol in an amount of from 0.05 to less than 1.5 parts by weight, still preferably from 0.1 to less than 1.0 part by weight, per part by volume of hexane. Although the treating temperature and pressure can be changed over a wide range, it is preferable to perform the procedure under the atmospheric pressure at room temperature. The phospholipid mixture may be obtained from the hexane phase by a well-known method (for example, evaporating to dryness with the use of an evaporator). Since neutral lipids cannot be removed in this step, the acidic phospholipid concentration in the residue can be further elevated by effecting an additional step of defatting (for example, washing with acetone), in particular, when fat-containing lecithin is employed.

In the present invention, the phospholipid mixture obtained in the above-mentioned first step may contain acidic phospholipids such as phosphatidylinositol (PI), phosphatidic acid (PA), phosphatidylserine (PS), lysophosphatidic acid (L-PA); neutral phospholipids, neutral lipids, glycolipids, etc. at arbitrary ratios. It is particularly preferable that the total content of PA and PI is 45% or more, still preferably 50% or more, based on the total phospholipids (i.e., the sum of the neutral phospholipids and the acidic phospholipids).

In the second step of the method of the concentration of acidic phospholipids of the present invention, it is necessary to treat the phospholipid mixture obtained in the first step with an aqueous solution containing 75% or less of ethanol. The content of ethanol in this aqueous solution ranges from 75 to 10%, preferably from 70 to 20%. When the ethanol concentration is excessively high, only a efficiency of the elimination of the water-soluble components is decreased. On the other hand, an excessively low ethanol concentration makes the recovery of the phospholipids difficult.

The treatment may be carried out under a well-known method without any restriction in conditions. For example, the phospholipid mixture obtained in the above-mentioned first step may be treated with the above-mentioned aqueous solution containing ethanol in an amount at least 1 time by weight, preferably at least 3 times by weight as much. After the completion of the treatment, phospholipids containing acidic phospholipids at an elevated purity are recovered from the phospholipid dispersion by centrifugation or filtration or with the use of a nonpolar organic solvent such as hexane.

Although the treating temperature and pressure are not restricted, it is preferable to perform the treatment under the atmospheric pressure at room temperature.

Owing to this treatment, water-soluble components (free saccharides, etc.) are extracted and removed, which makes it possible to obtain a lipid mixture wherein the acidic phospholipids have been further concentrated as compared with the lipid mixture obtained in the first step.

The acidic phospholipids contained in the acidic phospholipid concentrate obtained by the method of the present invention include phosphatidylinositol (PI), phosphatidic acid (PA), phosphatidylserine (PS) and lysophosphatidic acid (L-PA). Although these acidic phospholipids may be contained each at an arbitrary ratio, it is particularly preferable that the total content of PA and PI is 45% or more, still preferably 50% or more, based on the total phospholipids (i.e., the sum of the neutral phospholipids and the acidic phospholipids). The phospholipids obtained in the second step have the same composition as that of the phospholipids obtained in the first step but an elevated acidic phospholipid concentration, since the water-soluble components have been eliminated therefrom. Therefore, the total amount (purity) of PA and PI in the lipid mixture of the second step is 50% or more, still preferably 55% or more.

When the lipid mixture obtained by the method of the present invention, which contains acidic phospholipids at a high concentration, is to be used as a taste modifier for foods, its bitterness-relieving effect can be improved by further eliminating neutral lipids and neutral phospholipids contained therein.

The acidic phospholipid concentrate obtained by the method of the present invention can be appropriately used in drinks, foods, oral drugs or cosmetics.

According to the method of the present invention, the water-soluble components contained in the phospholipid mixture obtained in the first step are efficiently removed in the second step. Thus a lipid mixture containing acidic phospholipids at a high concentration can be relatively easily obtained from lecithin originating in a plant. This lipid mixture is useful as an emulsifier or a taste modifier.

To further illustrate the present invention in greater detail, and not by way of limitation, the following Examples will be given. Components of phospholipids were determined in accordance with the methods described in Yukagaku (Oil Chemistry), 35 (12), 1018–1024 (1984) by referring the molecular weights of PA, PC, PE and PI to respectively as 704, 773, 728 and 884.

EXAMPLE 1

(First step)

100 g of soybean lecithin (SLP Paste, manufactured by Tsuru Resichin Kogyo; material 1) was extracted with 95.0% ethanol (moisture content: 5.0%) in an amount of 5 times by weight as much as the phospholipide in the lecithin by stirring at 9,500 rpm in a disperser (manufactured by Janke & Kenkel) at 45° C. for 10 minutes. After filtering through a glass filter, the solvent was distilled off from the precipitate by using a vacuum dryer to thereby give a residue. This procedure was repeated 5 times in total.

(Second step)

The residue obtained in the first step was washed with 5 parts by weight, per part by weight of the residue, of a 50% aqueous solution of ethanol. After centrifugation and filtration, an acidic phospholipid concentrate was obtained.

EXAMPLE 2

100 g of soybean lecithin (SLP-Paste, manufactured by Tsuru Resichin Kogyo; material 1) was stirred in 500 ml of a solvent mixture composed of 80 parts by weight of 95% ethanol and 20 parts by weight of acetone. After filtration, the first extraction residue was obtained. Next, this first extraction residue was stirred in the same solvent mixture as the one described above and filtered to thereby give the second extraction residue. This procedure was repeated and the solvent was distilled off from the obtained extraction residue to thereby give a residue (the first step).

In the second step, the procedure of the second step of Example 1 was repeated to thereby give an acidic phospholipid concentrate.

EXAMPLE 3

The procedure of Example 1 was repeated except for using defatted soybean lecithin (SLP-W: manufactured by Tsuru Resichin Kogyo; material 2) as a substitute for the soybean lecithin.

EXAMPLE 4

The procedure of Example 2 was repeated except for using a mixture composed of 80 parts by weight of 95% ethanol, 15 parts by weight of acetone and 5 parts by weight of hexane as a substitute for the solvent mixture composed of 80 parts by weight of 95% ethanol and 20 parts by weight of acetone.

EXAMPLE 5

10 g of soybean lecithin (SLP-Paste, manufactured by Tsuru Resichin Kogyo; material 1) was dissolved in 200 g of hexane and introduced into a 300 ml separating funnel. After adding 50 g of 90% ethanol, the resulting mixture was shaken 100 times and then allowed to stand. Thus it separated out into an upper layer (n-hexane layer) and a lower layer (aqueous ethanol layer). Then the upper layer alone was taken out. This procedure was repeated 5 times. Next, the hexane of the upper layer obtained in the first step was topped to thereby recover the solid matters. These solid matters were washed with 5 parts by weight, per part by weight of the solid matters, of acetone under ice-cooling and then the precipitate was collected. This procedure was repeated thrice. After removing the acetone contained in the precipitate, the residue was washed with 5 parts by weight, per part by weight of the residue, of an aqueous solution containing 50% of ethanol and centrifuged to thereby give an acidic phospholipid concentrate.

EXAMPLE 6

The procedure of Example 2 was repeated except for using 100% ethanol (moisture content: 0%) as a substitute for the 95% ethanol (moisture content: 5.0%) employed in the first step of Example 2.

COMPARATIVE EXAMPLE 1

The procedure of Example 1 was repeated except for omitting the second step.

COMPARATIVE EXAMPLE 2

100 g of soybean lecithin (SLP Paste, manufactured by Tsuru Resichin Kogyo; material 1) was washed with an aqueous solution containing 50% of ethanol, centrifuged and filtered to thereby give a phospholipid mixture as the residue.

COMPARATIVE EXAMPLE 3

The procedure of Example 1 was repeated except for using defatted soybean lecithin (SLP-W: manufactured by Tsuru Resichin Kogyo; material 2) as a substitute for the soybean lecithin and omitting the second step.

COMPARATIVE EXAMPLE 4

100 g of defatted soybean lecithin (SLP-W Paste, manufactured by Tsuru Resichin Kogyo; material 2) was extracted with 75% ethanol (moisture content: 25%) in an amount of 5 times by weight as much as the phospholipids contained in the lecithin by stirring at 9,500 rpm in a disperser (manufactured by Janke & Kenkel) at 45° C. for 10 minutes. After filtering through a glass filter, the solvent was distilled off from the precipitate by using a vacuum dryer to thereby give a residue. This procedure was repeated 5 times in total to thereby give a phospholipid mixture.

The phospholipid concentrates obtained in the above Examples and Comparative Examples were examined in taste-modifying effect.

(Evaluation of taste-modifying property)

To regular coffee was added 0.05% of each of the samples obtained in Examples and Comparative Examples. Then the mildness of the coffee was evaluated in 2 grades.

The results of the evaluation and the phospholipid compositions (expressed in % by weight in lipid mixture) are shown in Table 3 below. The compositions of the materials 1 and 2 are shown in Table 2 below.

TABLE 2

| Phospholipid | Soybean lecithin (material 1) (wt. %) | Defatted soybean lecithin (material 2) (wt. %) |
|---|---|---|
| PC | 18.5 | 25.6 |
| PE | 16.2 | 24.1 |
| PA | 5.4 | 8.3 |
| PI | 7.8 | 11.7 |
| (PA + PI) | 13.2 | 20.0 |
| glycolipid | 15.0 | 22.0 |
| neutral lipid | 34.0 | 4.0 |
| others | 3.1 | 4.3 |

TABLE 3

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| PC | 0.3 | 0.7 | 0.4 | 0.4 | 0.7 | 0.6 | 1.7 | 27.2 | 0.6 | 10.5 |
| PE | 19.5 | 8.2 | 18.2 | 9.5 | 13.2 | 10.9 | 21.1 | 25.5 | 18.4 | 17.0 |
| PA | 27.0 | 28.2 | 28.5 | 23.5 | 25.8 | 26.1 | 18.6 | 8.8 | 21.2 | 7.0 |
| PI | 29.2 | 29.8 | 29.9 | 36.5 | 38.3 | 28.8 | 22.1 | 12.4 | 23.5 | 10.5 |
| (PA + PI) | 56 | 58.0 | 58.4 | 60.0 | 64.1 | 54.9 | 40.7 | 21.2 | 44.7 | 17.5 |
| taste-modifying effect | A | A | A | A | A | A | B | B | B | B |

*:
A: mild.
B: not mild

While the invention has been described in detail and with reference to specific embodiments embodiments thereof, it will be apparent to one skilled in the art that various changes and modifications can be made therein without departing from the spirit and scope thereof.

What is claimed is:

1. A method of the concentration of acidic phospholipids which comprises a first step wherein lecithin originating in a plant is treated with a solvent containing at least one component which is from 85 to 100% by weight of a lower alcohol and 15 to 0% by weight water, and then a resulting solvent fraction containing said lower alcohol is separated from a resulting residue fraction comprising a phospholipid mixture, and a second step wherein said phospholipid mixture is treated by using an aqueous solution containing from 10% to 75% by weight of ethanol.

2. A method of the concentration of acidic phospholipids as claimed in claim 1, wherein said solvent containing a lower alcohol further contains acetone or hexane in addition to the lower alcohol.

3. A method of the concentration of acidic phospholipids as claimed in claim 1, wherein the treatment with a solvent containing a lower alcohol results in a liquid-liquid partition, the solvent comprising a two phase system of said at least one component and hexane.

4. A method of the concentration of acidic phospholipids as claimed in claim 1, wherein said lecithin originating in a plant comprises lecithin selected from the group consisting of soybean lecithin, rapeseed lecithin, corn lecithin, and mixtures thereof.

5. A method of the concentration of acidic phospholipids as claimed in claim 1, wherein said acidic phospholipids are phosphatidylinositol and phosphatidic acid.

6. A method of the concentration of acidic phospholipids as claimed in claim 1, wherein, in the first step, said lecithin originating in a plant is treated with said solvent containing a lower alcohol at a temperature of 30° C. or more.

\* \* \* \* \*